United States Patent
Ida et al.

(10) Patent No.: US 9,502,953 B2
(45) Date of Patent: Nov. 22, 2016

(54) SLIDING DEVICE

(71) Applicant: NIPPON THOMPSON CO., LTD., Minato-ku, Tokyo (JP)

(72) Inventors: Eiji Ida, Mino (JP); Ken Nomura, Kamakura (JP); Kazuki Yamagishi, Kamakura (JP)

(73) Assignee: NIPPON THOMPSON, CO., LTD., Tokyo (JP)

( * ) Notice: Subject to any disclaimer, the term of this patent is extended or adjusted under 35 U.S.C. 154(b) by 689 days.

(21) Appl. No.: 13/903,431

(22) Filed: May 28, 2013

(65) Prior Publication Data

US 2013/0313920 A1    Nov. 28, 2013

(30) Foreign Application Priority Data

May 28, 2012   (JP) ................. 2012-121128

(51) Int. Cl.
| | | |
|---|---|---|
| H02K 33/00 | (2006.01) | |
| H02K 41/03 | (2006.01) | |
| H02K 5/04 | (2006.01) | |

(52) U.S. Cl.
CPC ............ *H02K 33/00* (2013.01); *H02K 41/031* (2013.01); *H02K 5/04* (2013.01)

(58) Field of Classification Search
CPC ........ H02K 33/00; H02K 35/00; H02K 5/00; H02K 5/04; H02K 41/00; H02K 41/02; H02K 41/025; H02K 41/03; H02K 41/031
USPC .......... 310/12.33, 12.01, 12.06, 12.19, 12.27
See application file for complete search history.

(56) References Cited

U.S. PATENT DOCUMENTS

| | | | | |
|---|---|---|---|---|
| 5,196,745 A * | 3/1993 | Trumper | ................. | F16C 29/00 310/12.06 |
| 5,315,189 A * | 5/1994 | Neff | ..................... | H02K 41/035 29/834 |
| 6,841,899 B2 * | 1/2005 | Kaneko | .................. | H02N 2/023 310/12.31 |
| 2002/0117920 A1 * | 8/2002 | Trowbridge | ............. | H02K 5/00 310/89 |
| 2003/0183466 A1 * | 10/2003 | Thayer | .................... | F16F 7/122 188/371 |
| 2005/0258689 A1 * | 11/2005 | Kitade | .................. | H02K 41/03 310/12.25 |
| 2006/0049700 A1 * | 3/2006 | Moriyama | .......... | G03F 7/70758 310/12.06 |
| 2007/0063804 A1 * | 3/2007 | Watanabe | ................. | H01F 3/10 336/83 |
| 2007/0257564 A1 * | 11/2007 | Kitade | .................. | H02K 41/03 310/12.23 |
| 2008/0169708 A1 * | 7/2008 | Shibata | .................. | G03B 27/58 310/12.06 |
| 2009/0278412 A1 * | 11/2009 | Kimura | .................. | H02K 41/03 310/28 |
| 2010/0066217 A1 * | 3/2010 | Fujikawa | ............. | H05K 5/0013 312/7.2 |
| 2011/0109252 A1 * | 5/2011 | Takagi | .................. | H02K 41/03 318/135 |

FOREIGN PATENT DOCUMENTS

JP     2007300759 A     11/2007

* cited by examiner

*Primary Examiner* — Michael Andrews
*Assistant Examiner* — Robert E Mates
(74) *Attorney, Agent, or Firm* — Browdy and Neimark, PLLC

(57) ABSTRACT

A covering is easily mounted and/or demounted to envelop an overall sliding device with onboard moving-magnet linear motor. The covering helps improved propulsion, high velocity and response of a table even with small in dimension, compact in construction. End blocks are installed in opposite ends of a bed and a linear motor is placed between the bed and the table. The end blocks are made in solid bodies which are tightened to the bed together with a coil board. The end blocks have butting surfaces which can come into abutment against the ends of the table to protect the table from getting out of the bed. The end blocks have locking recesses which mate with locking jaws on the covering to fasten the covering to the end blocks.

4 Claims, 7 Drawing Sheets

SLIDING DEVICE

FIELD OF THE INVENTION

The present invention relates to a downsized or miniature sliding device of the overall flat construction in which a linear motor is built in between a bed of rectangular board and a table of rectangular board mounted for reciprocation by virtue of a linear motion guide unit and, more particularly, it relates to a downsized sliding device having a dust-proof and/or safety covering which may be mounted and/or demounted with ease.

BACKGROUND OF THE INVENTION

A diversity of machinery including semiconductor manufacturing equipment, precision machines, measurement/inspection instruments, medical equipment, robots, assembling machines, micromachines and so on in recent years is designed compact or reduced in construction in favor of energy saving or high energy efficiency. Correspondingly, linear motion guide units for position control in reciprocation onboard the machinery stated just earlier are also needed compact or downsized in construction while expected to carry out highly precise position control, high speed and high response rate in operation, and further high reliability in dust-proofing and/or safety.

In a commonly-owned Japanese Laid-Open Patent Application No. 2007-300 759 there is disclosed a sliding device with onboard moving magnet linear motor, which is compact and simple in construction, better in high accuracy, high speed and high response rate in operation, high reliability in dust-proofing, and further easier in use and handling, and inexpensive in production.

The prior sliding device with onboard moving magnet linear motor recited earlier would be prove successful, to some extent, in high performance and ease in use and handling. Nevertheless, the advanced sliding devices with onboard moving magnet linear motor are more needed to meet anticipated design specifications of miniature or microscopic sliding device which is lower than ever in height a transverse section or in an overall height of the sliding device. This means that the smaller the sliding device in construction is, the less the propulsion of the sliding device. As a result, the sliding device is more prone to undergo any potentially adverse effects because of foreign matter such as dirt and dust caused by external atmosphere. To cope with this, the sliding device will be needed to have a dust-proof covering from an aspect of safety of the sliding device against the external environments.

Modern sliding devices with onboard moving magnet linear motor finding their applications in diverse fields including semiconductor manufacturing equipments, various assembling machines, measuring instrument, and so on are more needed to meet their downsizing or miniaturization and safety or protection against foreign material in addition to highly accurate position control, high speed and high response rate in operation. One of major challenges in the miniature sliding device, thus, resides in how to deal with the questions of protection against the external environments associated with downsizing or miniaturization in construction

SUMMARY OF THE INVENTION

The present invention has as its primary object to overcome the subject stated earlier and, in particular, to provide a sliding device with onboard moving-magnet linear motor, in which the sliding device has an overall miniature flat configuration and further a dust-proof cover is mounted with ease.

The present invention is concerned with a sliding device with a top surface and a bottom surface of an overall flat configuration, comprising: a plate-like bed of quadrilateral shape, a quadrilateral plate-like table movable for reciprocation relative to the bed through a pair of linear motion guide units mounted on lengthwise side edges of the bed, and a moving-magnet linear motor built in between the table and the bed to extend lengthwise between the linear motion guide units and composed of a field magnet array and an armature assembly lying in opposition to the field magnet array;

wherein a covering is mounted to end blocks installed on lengthwise opposite ends of the bed, the covering being composed of a ceiling part having an opening in opposition to an upper surface of the table and enveloping from above the sliding device around the opening, and a peripheral part extending downwards from the ceiling part to surround around the lengthwise side edges and the lengthwise opposite ends of the bed: and wherein an auxiliary table smaller in size than the table is fastened to the top surface of the table across the covering, a member such as a work being mounted on the auxiliary table to be controlled in position.

The auxiliary table has a rectangular shape and is secured to a lengthwise middle of the table, a length of the auxiliary table in moving direction being less than a length of the table subtracted by twice a stroke distance of the table, and wherein the opening in the covering is formed in a rectangular contour of a dimension which conceals lengthwise opposite ends of the table from view after the table has moved within a movable range.

The bed has a lengthwise recess extending in a moving direction of the table and an armature assembly fits into the recess in a condition a coil board down. The end blocks fit into the recess at the lengthwise opposite ends of the bed in adjacency to lengthwise opposite ends of the armature assembly. The end blocks are tightened together with the coil board to the bed with using screws extended through holes formed on side ends of the end blocks, the end blocks being raised above the bed up to a height short of the top surface of the table to keep the table against getting out of the bed, and further the end blocks have butting surfaces to come into collision with the lengthwise opposite ends of the bed, the butting surfaces of the end blocks having elastically deformable cushioning portions in which many vertical ridges of a triangle in cross section are juxtaposed closely each other in a widthwise direction.

Moreover, the end blocks each are a solid body defined with a top surface, widthwise opposite side surfaces and an outward rear surface to keep the covering in place, and the outward rear surface having thereon a locking recess, and the covering on interior end surfaces thereof has locking jaws extended above the interior end surfaces in opposition to the locking recesses of the end blocks, so that the locking jaws make fit-engagement with the locking recesses on the end blocks after the peripheral part around the locking jaws have suffered partially an elastic deformation.

The end sides of the covering at widthwise opposite ends thereof are each partially cut away or gouged out to make it easier to get direct access to holes which are made at four corners of the bed and used to fasten the sliding device to a machine bed and so on.

One of the end blocks has a recess open to fit snugly over a connector molded and wired with a power cable of the armature assembly, the end block having a flat bottom to come into close engagement with the coil board, and another end block has on a bottom surface thereof a stepwise recess to fit over one end of the coil board.

With the sliding device of the overall flat configuration with onboard moving-magnet linear motor constructed as recited earlier, the pair of end blocks has the locking recesses which make it possible to mount the dust-proof or protective covering with only one-touch operation to envelop or shroud the overall sliding device from above, and the table is provided on the top surface thereof with a plurality of threaded holes which are used to mount an auxiliary table in a fashion raised above the covering, an that the covering can be mounted to the sliding device with ease.

Further, the end blocks are monolithic solid bodies having cushioning portions which are easily not to the lengthwise opposite ends of the bed to come into abutment against any one of lengthwise opposite ends of the table. One of the end blocks is designed to have the connector wired with the armature assembly, while another block is customized to lie in opposition to the one end block, so that the sliding device itself may be made compact in construction.

Moreover, the covering envelops the overall sliding device from above save for the opening as small as permitted, and the linear motor is the moving-magnet linear motor with no need of moving cable so that the mechanical sliding parts are limited to only the linear motion guide unit. Thus, the sliding device of the present invention realizes high clean environment and high safety even with small or compact in construction.

DETAILED DESCRIPTION OF THE PREFERRED EMBODIMENTS

Figure 1:
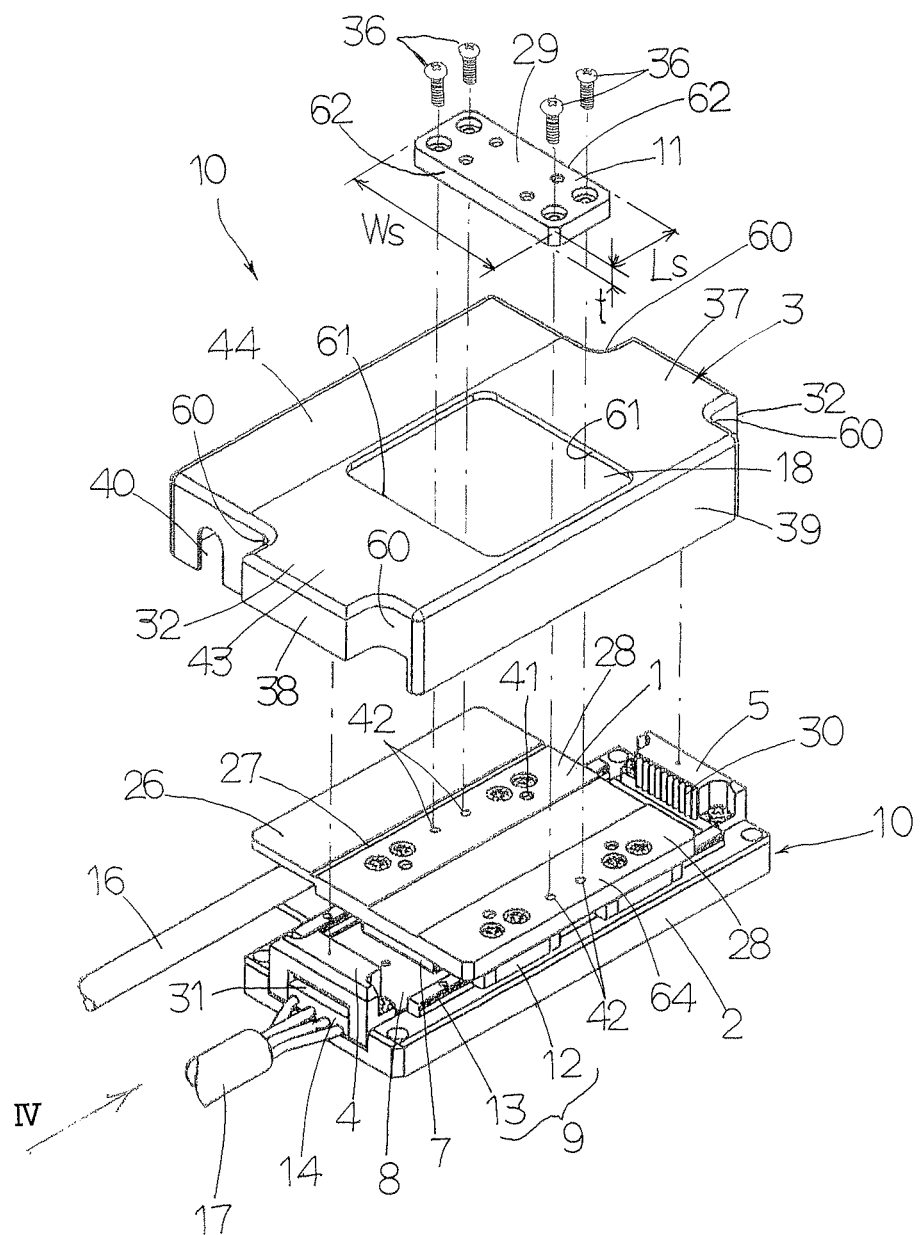
FIG. 1 is an exploded view in perspective showing a preferred embodiment of a sliding device with a covering according to the present invention.

The sliding device of the present invention is envisaged incorporating it in a diversity of machinery including semiconductor manufacturing equipments, precision machines, measuring/inspection instrument, medical machines, robots, various assembling machines, micromachines, and so on.

Compared with the sliding device with onboard moving-magnet linear motor of the prior art disclosed in, for example, Japanese Laid-Open Patent Application No. 2007-300759 recited earlier, the sliding device with onboard moving-magnet linear motor of the present invention features more miniature or midget construction in the overall dimensions including an overall height H, overall width W and overall length L, for instance, H=11 mm. W=38 mm and L=62 mm. The sliding device with onboard moving-magnet linear motor of the present invention further features a dust-proof cover is mounted with ease.

Preferred embodiments of a sliding device according to the present invention will be explained later in detail with reference to the accompanying drawings. A sliding device 10 of a substantially overall flat configuration is mainly comprised of plate-like or flat bed 2 of quadrilateral shape, a quadrilateral plate-like or flat table 1 movable for reciprocation relative to the bed 1 through a pair of linear motion guide units 9 mounted on lengthwise side edges of the bed 1, and a moving-magnet linear motor 6 built in between the table 1 and the bed 2 to extend lengthwise between the linear motion guide units 9 and composed of a field magnet array 7 and an armature assembly 8 lying in opposition to the field magnet array 7. The sliding device 10 with onboard moving-magnet linear motor 6, though following a shape of prior sliding devices as shown in FIGS. 1 to 5, is defined between top and bottom flat surfaces on as to have an overall rectangular shape in transverse section, and constituted with the plate-like bed 2 of quadrilateral shape, the quadrilateral plate-like table 1 forced for reciprocation relative to the bed 1 through the pair of linear motion guide units 9 arranged spaced widthwise from each other on the bed 1, and the moving-magnet linear motor 6 built in between the table 1 and the bed 2 to extend lengthwise between the linear motion guide units 9. Especially, the sliding device of the present invention features that the linear motion guide unit lying between the bed 2 and the table 1 is made as small in height as permitted to help make the overall height as less as possible.

Figure 3:
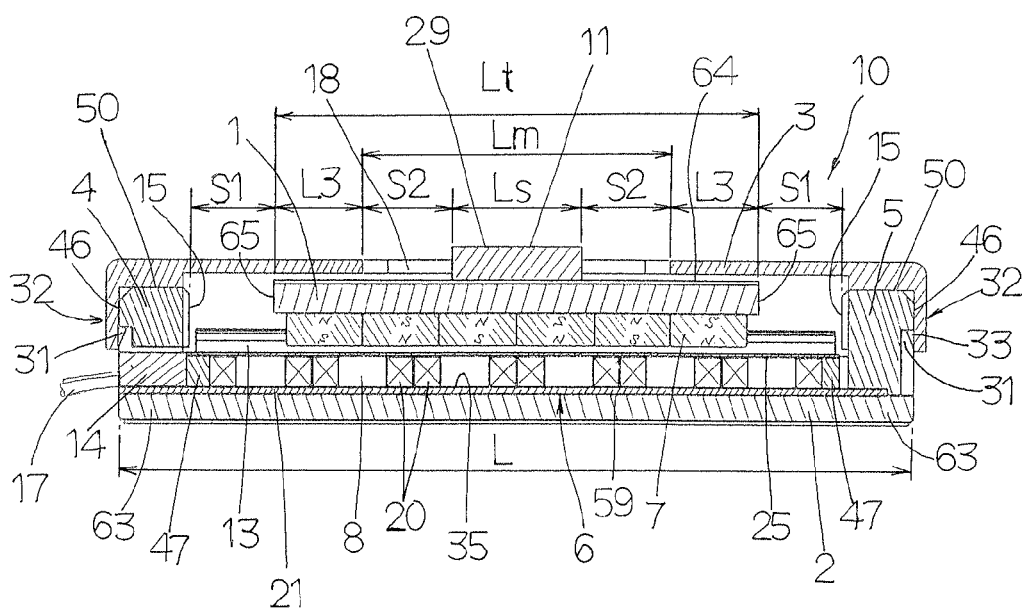
FIG. 3 is a view in longitudinal section of the sliding device with the covering, the view being taken on the plane of line III-III of FIG. 2.
Figure 4:
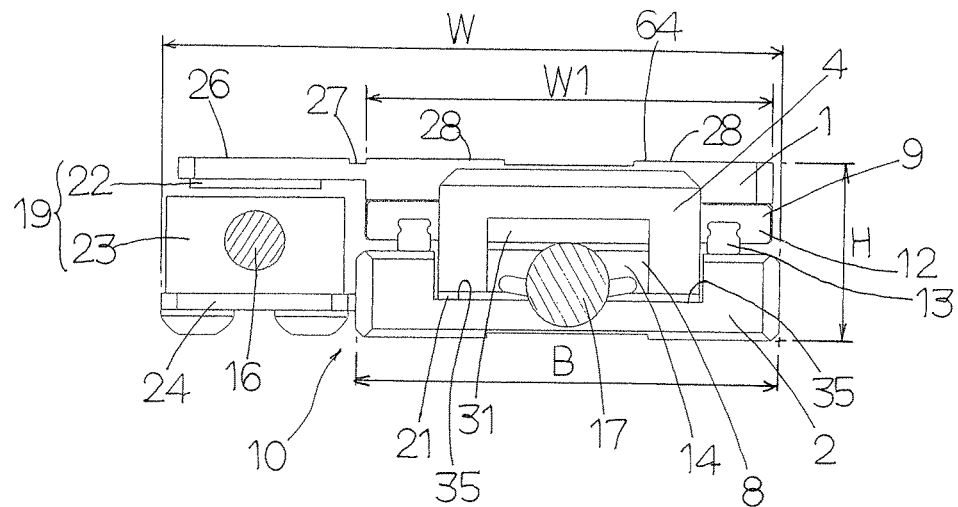
FIG. 4 is a view in side elevation of the sliding device of FIG. 1, as seen looking in the direction of an arrow sign IV in FIG. 1.
Figure 5:
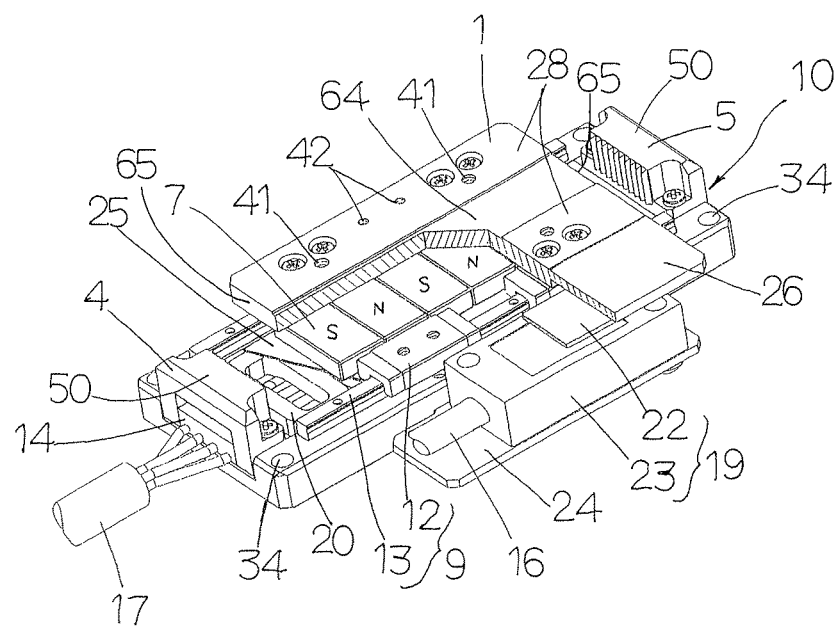
FIG. 5 is a partially cutaway view in perspective of the sliding device which is shown turned over 180 degrees relative to FIG. 1 after both a power cable and a sensor line have been changed to the direction opposite of FIG. 1.

The linear motor 6 built in the sliding device 10 as shown in FIGS. 3 and 5 is composed of the field magnet or permanent magnet array 7 mounted to the underneath of the table 1 to lie between the linear motion guide units 9, and the armature assembly 8 mounted to the top of the bed 2 to lie between the linear motion guide units 9 in opposition to the field magnet array 7. More especially, the field magnet array 7 includes any number of permanent magnet strips 7M lying in a way unlike magnetic polarities are juxtaposed alternately in a traveling direction of the table 1. The permanent magnet strips 7M are of rectangular flat segments, which are six poles in the embodiment shown here. Moreover, the armature assembly 8 as shown in FIGS. 3 to 5 has an elongated coil board 21 mounted on the bed 2, many coreless armature coils 20 of rectangular, flat configuration whose number is six in the embodiment shown here, the careless armature coils 20 being installed in juxtaposition in a lengthwise direction of the coil board 21 or a traveling direction of the table 1, a protective sheet 25 of thin film concealing from upper the overall surface of the armature coils 20, and a power cable 17 connected to an upper surface of any one of forward and aft ends of the coil board 21 to feed the armature coils 20 with electric power. With the armature assembly 8 constructed as stated earlier, the coil board 21, armature coils 20 and the protective sheet 25 are secured together each other with adhesive material or bonding agent. The armature coils 20 lying between the coil board 21 and the protective sheet 25 are also shrouded around them with a molding 47 of another adhesive material or bonding agent. Moreover, wiring connections of the power cable 17 are also molded into a connector 14 to be kept against exposure. Overall, the armature assembly 8 is made integral unit. The armature coils 20 are grouped into any number of sets of three coils 20, six coils being grouped into two sets of three coils in the embodiment shown here. Each of the three coils carries any one phase current of three-phase conduction system (U-. V-, and W-phase).

With the sliding device 10 of the present invention, the bed 2 is made of magnetic material so as to serve as a magnet yoke while the bed 1 is also made of magnetic material so as to serve as a coil yoke. Especially, the present invention is intended to construct the sliding device 10 more midget or miniature as shown in FIGS. 3 and 4 than in the prior downsized sliding device. In the embodiment of the sliding device 10 shown here., the overall height H in the transverse section was made reduced down to H=11 mm, while the overall width W and the overall length L of the sliding device 10 were shrunk down to W=38 mm and L=62 mm, respectively.

The midget construction of the sliding device 10 has need of shrinkage of every component or part as a matter of course. The bed 2 on the top thereof sinks at midway between the lengthwise side edges thereof opposite widthwise each other to have a lengthwise recess 35. On the lengthwise top edges to define the recess 35 in the bed 2, there are provided the midget linear motion guide units 9 constituted with the elongated guide rails 13 fastened to the lengthwise top edges of the bed 2 and the sliders 12 which fit over or conform to the guide rail 13 to slide on the guide rail 13 through rolling elements, not shown. On a lengthwise bottom of the recess 35 flanked by the linear motion guide units 9, the coil board 21 along a lower surface thereof is abutted to snugly fit the armature assembly 8 into the recess 35. Moreover, a cupper foil 59 in favor of radiation is secured on the lower surface of the coil board 21 and, therefore, irrespective of the coil board 21 being confined inside the recess 35, heat caused by the linear motor 6 gets adequately radiant by virtue of conduction of the cupper foil 59 without confined inside the armature assembly 8 no that the sliding device 10 is kept at moderate temperature.

An optical linear encoder 19 used for highly accurate position control in the sliding device 10 of the present invention is the type of the same size as in the prior encoder in light of past results of performance and cost performance. The optical linear encoder 19 as shown in FIGS. 4 and 5 has a sensor element 23 mounted on the top of a shelf 24 sidewise extending beyond the side edge of the bed 2, and a linear scale 22 extending in the traveling direction of the table 1 in opposition to the sensor element 23, the linear scale 22 being fastened to the underneath of an eaves 26 sidewise extending beyond the side edge of the table 1.

Thus, the sliding device 10 of the present invention is constructed to make it possible to accommodate the linear encoder 19 having the same size as in the prior encoder. The top of the eaves 26 having the linear scale 22, as shown in FIGS. 1 and 4, may take part in a fiat mounting surface against which is supported any member such as a work and so on, not shown. Nevertheless, when any work is mounted on the top of the eaves 26 as on the mounting surface 28 of the table 1, the eaves 26 burdened with the work would adversely affect the linear scale 22. To cope with this, a grooved mark 27 is made at a boundary between the mounting surface 28 of the table 1 and the top of the eaves 26 to keep the linear scale 22 affixed to the eaves 26 against potential influence caused by any work mounted on the mounting surface 28 of table 1. Moreover, the mounting surface 28 of the table 1 has some threaded holes 41 which are used to fasten the member such as the work, and so on.

The more downsized or miniature the sliding device 10 in construction as shown in FIGS. 1 to 5, the smaller the field magnet array 7M and the armature coils 20 are. As a result, the sliding device 10 is less in propulsion and prone to undergo any potentially adverse impacts of external environments. For the reasons as stated just earlier, the sliding device 10 of the present invention features a dust-proof covering 3 to reduce the impacts of the external environments from an aspect of safety of the sliding device against the external environments, the dust-proof covering 3 being mounted and/or demounted with ease from end blocks 4 and 5 installed on the sliding device 10.

More especially, the end blocks 4 and 5 fit into the lengthwise recess 35 at forward and aft ends 63 of the bed 2 in adjacency to lengthwise opposite ends of the armature assembly 8 which fits into the recess 35, the coil board 21 thereof down, to extend in the traveling direction of the table 1. The dust-proof covering 3 fits over the end blocks 4 and 5 to envelop from above the overall sliding device 10. The end blocks 4 and 5 are solid bodies raised above the bed 2 up to a height short of a top surface 64 of the table 1 to keep the table 1 against getting out of the bed 2. The end blocks 4 and 5 are tightened or fastened together with the coil board 21 to the bed 2 with using screws extended through holes made on side ends of the end blocks 4 and 5. The end blocks 4 and 5 have butting surfaces 15 which would make collision with forward and aft ends 65 of the table 1. Moreover, the end blocks 4 and 5 are each defined with a top surface 50, widthwise opposite side surfaces 48 and a rear surface 46 having thereon a locking recess 31 for engagement. The table 2 is provided on the top surface 64 thereof with a plurality of threaded holes 42 which are used to mount an auxiliary table or sub-table 11 in a fashion somewhat raised above a top surface 43 of the covering 3 through an opening 18 in the covering 3 which has been mounted on the bed 2. The embodiment of the sliding device 10 discussed here had the maximum propulsion of 3. ON, rated propulsion of 0.6 N, and a stroke of for example 10~18 mm.

Figure 2:
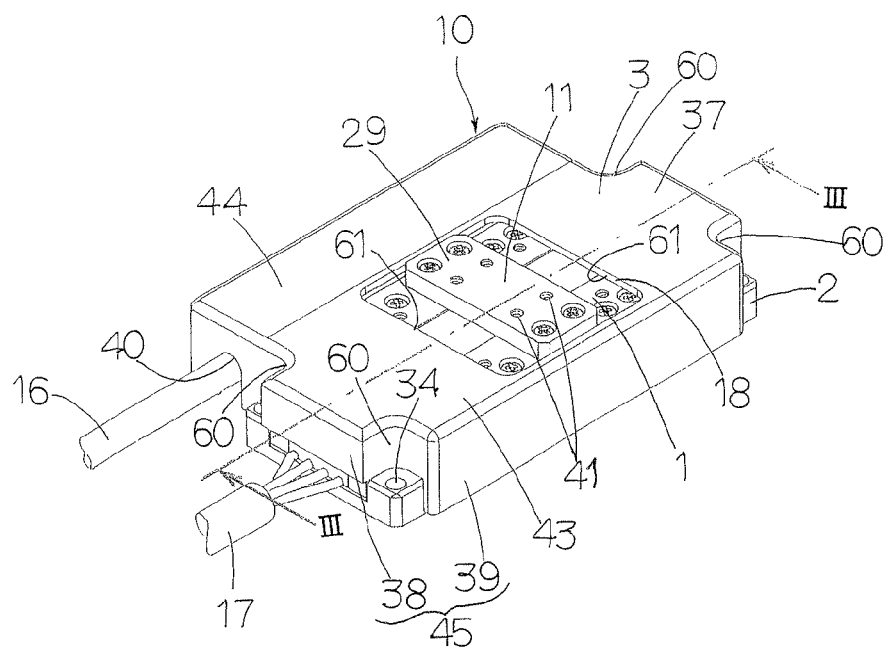
FIG. 2 is a view in perspective of the sliding device having mounted with the covering of FIG. 1

With the sliding device 10, the covering 3 as shown in FIGS. 1 to 3 is designed to enclose from above the overall sliding device 10. Moreover, the covering has the opening 18 lying in opposition to the top surface of the table 1 and the auxiliary table 11 smaller in size than the table 1 is supported through the opening 18 on the table 1 to mount any member such as the works and so, not shown, to the table L The auxiliary table 11 is fastened to the mounting surface 28 of the table 1 with using some screws 36 driven into threaded holes 42 on the mounting surface 28. The covering 3 as shown in FIG. 2 is out away or hollowed out at 60 to make it easier to get access to holes 34 which are used to fasten the sliding device 10 to any machine bed and so on, not shown. With the embodiment shown here, the holes 34 available for fastening the sliding device 10 to the machine bed, not shown, are made at four corners at the forward and aft ends of the bed 2.

The auxiliary table 11 is secured to the lengthwise middle of the mounting surface 28 of the table 1 with screws 36 after the covering 3 has mounted on the table 1. The auxiliary table 11 has a rectangular shape of width Ws, length Ls and thickness t, of which the mounting surface 26 is placed somewhat raised above the top surface 43 of the covering 3. Moreover, the auxiliary table 11 has a dimension (width Ws and length Ls) enough to render a stiffness or rigidity sufficient to bear at least a load-carrying capacity of the sliding device 10. The opening 18 in the covering 3 is formed in a rectangular contour of a dimension which allows the auxiliary table 11 to move within the movable range of the table 1. Preferably, the opening 18 is restricted in length to conceal the forward and aft ends of the table 2 from view and in width within the widthwise dimension of the table 1 to make the dust-proof performance better. The auxiliary table 11 is fastened to the table 1 at the middle in the traveling direction of the table 1. A traveling distance of the table 1 is defined less than the length of the table 1 subtracted by twice the stroke distance S of the table 1.

With the sliding device 10 in which the auxiliary table 11 as shown in FIG. 3 is secured to the lengthwise middle of the mounting surface 28 of the table 1 to conceal the forward and aft ends of the table 2 from view, now assuming that the length of the table 1 is Lt, the stroke of the table 1 is S (=2×S1), the length of the opening 18 in the covering 3 is Lm, the length of the auxiliary table 11 is Ls, a distance 82 between an edge 62 of the auxiliary table 11 and a window frame 61 around the opening 18 is defined as S2>S1 to keep the edge 62 of the auxiliary table 11 against coming into collision with the window frame 61 around the opening 18 after the auxiliary table 11 has moved on one side over the stroke S1.

Now assuming that a distance between the forward and/or aft end of the table 1 and the window frame 61 when the auxiliary table 11 stays at the initial lengthwise middle of the mounting surface 28 of the table 1 is L3, the relation of L3≥S1 is required in order to still keep the forward and aft ends 65 of the table 1 from exposure out of the other window frame 61 after the auxiliary table 11 has moved on the one side across the stroke S1.

The above relations combines to yield the length Ls of the auxiliary table 11: Ls=Lt−2×(S2+L3). Thus, the length Ls may be written as Ls<Lt−2S. As for the length Lm of the opening 18 in the covering 3, Lm>Ls+S may be derived from the equation of Lm=Ls+2×S2.

In the actual embodiment, the sliding device was carried out with Lt=38 mm, S=13 mm, Ls=10 mm and Lm=24 mm.

Figure 6:
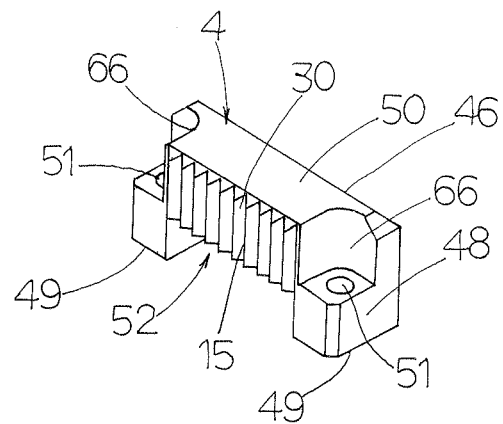
FIG. 6 is a view in perspective showing an end block to fit over a connector in FIG. 1.
Figure 7:
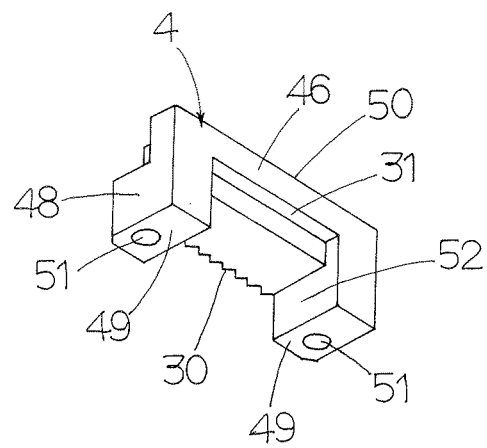
FIG. 7 is a rear view in perspective of the end block of FIG. 6.

With the sliding device 10 constructed as stated earlier, the covering 3 has the opening 18 somewhat larger in width Wm than the width Ws of the auxiliary table 11. The covering 3 is constituted with a ceiling part 37 around the opening 18 to close from above the overall sliding device 10, and a peripheral part 45 having lengthwise opposite end sides 38 and widthwise opposite lengthwise sides 39 all of which extend downwards from the ceiling part 37 to surround around the sliding device 10. The covering 3 is kept in place relative to the pair of end blocks 4 and 5 at the forward and aft ends of the sliding device 10. The end blocks 4 and 5 are secured to the forward and aft ends 63 of the bed 2 of the sliding device 10, with being raised above the to of the bed 2 to provide the butting surfaces 15 which makes collision with the forward and aft ends 65 of the table 1 to keep the table 1 against getting out of the bed 2. The top surfaces 50 of the end blocks 4 and 5 are lower in height than the top surface 64 of the table 1. On the butting surfaces 15 of the end blocks 4 and 5, there are provided cushioning portions 30 which are prone to suffer elastic deformation when having made collision with the forward and aft ends 65 of the table 1. The cushioning portions 30 on the end blocks 4 and 5 each have a jagged pattern in which many vertical ridges of a triangle in cross section are juxtaposed closely each other in a widthwise direction of the sliding device 10. Moreover, each of the end blocks 4 and 5 as shown in FIGS. 6 to 9 is made in a polyhedron with six faces or a hexahedron most suited to keeping the covering 3 in place, and made of synthetic resin easy to suffer elastic deformation and more suited for production. The end blocks 4 and 5 fit into the lengthwise recess 35 in adjacency to the lengthwise opposite ends of the armature assembly 8 which fits into the recess 35, and then the blocks 4 and 5 are tightened with screws to the bed 2 together with the coil board 21. The sides of the end blocks 4 and 5 are partially gouged out at 66, where the holes 51 are made for the screws to tighten the end blocks 4 and 5 to the bed 2. One of the end blocks 4 and 5, or the end block 4 shown in the embodiment, has the connector 14 wired with the power cable 17 of the armature assembly 8. The end block 4 as shown in FIGS. 6 and 7 has a recess 52 open to fit snugly over the connector 8 and a flat bottom 49 to come into close engagement with the coil board 21.

Figure 8:
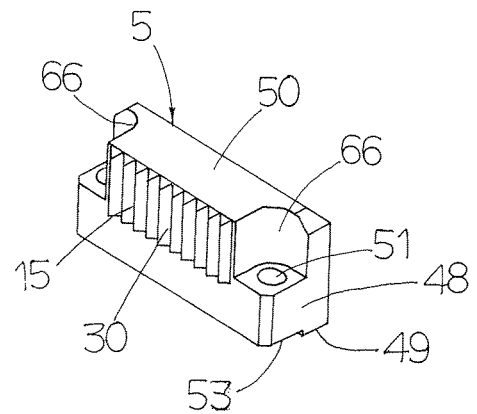
FIG. 8 is a view in perspective of another end block lying in opposition to the end block of FIG. 6.
Figure 9:
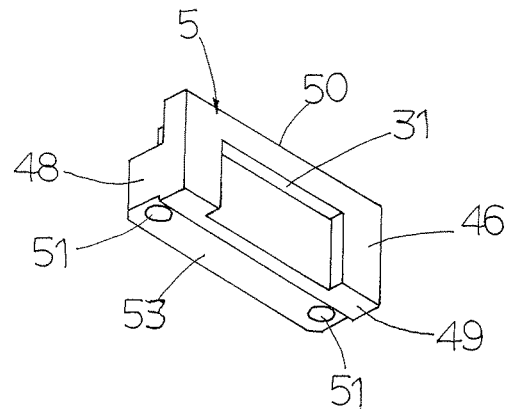
FIG. 9 is a rear view in perspective of the end block of FIG. 3.
Figure 10:
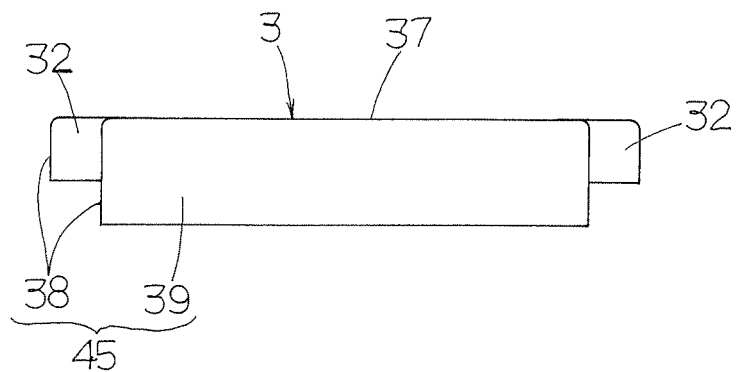
FIG. 10 is a view in front elevation showing a covering of FIG. 1.
Figure 11:
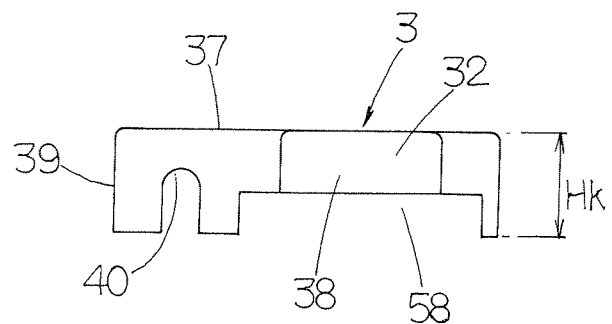
FIG. 11 is a view in side elevation showing the covering of FIG. 10.
Figure 12:
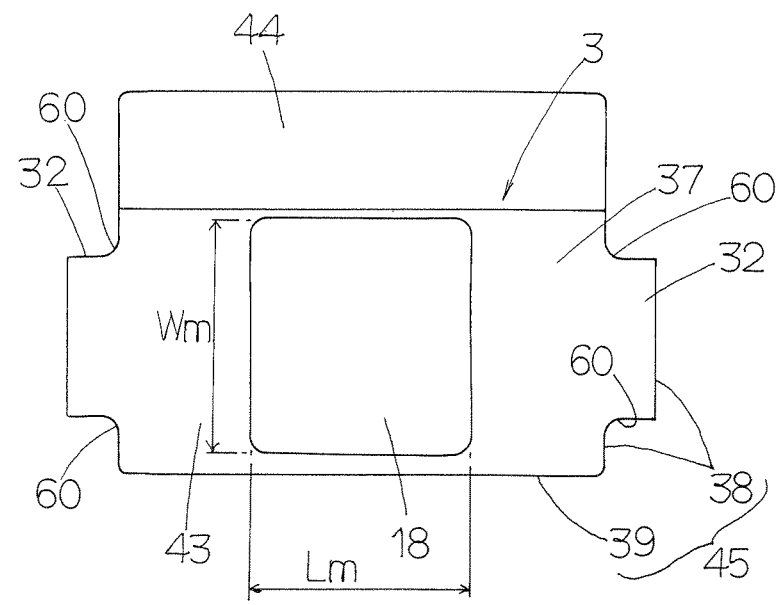
FIG. 12 is a view in top plan showing the covering of FIG. 10.

Another end block 5 opposite to the end block 4 constructed as stated earlier, as shown in FIGS. 8 and 9, has no recess like the open recess 52 in the end block 4, but a stepwise recess 53 on the bottom thereof to fit partially over one end of the coil board 21 and one end of the recess 35 on the bed 2. The end blocks 4 and 5 are identical with each other in the dimension between the widthwise opposite sides. Moreover, the end blocks 4 and 5 on their rear surfaces 46, as shown in FIG. 3, have the locking recesses 31 which are expected to make engagements with locking hooks or jaws 33 of the covering 3. The tops 50 of the end blocks 4 and 5 lying on the bed 2 as shown in FIG. 3 are somewhat lower or identical in height with the mounting surface 28 of the table 1 to make abutment with a lower surface or bottom of the covering 3, thereby serving as a reference in level to determine the vertical position of the covering 3. With the sliding devices 10 in FIGS. 1 and 5, the power cable 17 and the sensing line 16 are shown in opposite sides each other. Thus, the sliding device 10 of the present invention may be exchanged between versions of FIG. 1 and FIG. 5 with respect to the longitudinal direction of the slider device 10 by only changing the end blocks 4 and 5 and the sensor element 23 in opposite sides. Both the bed 2 and the table 1 are each in widthwise symmetry with respect to the lengthwise direction thereof.

The dust-proof covering 3 as shown in FIGS. 10 to 15 is designed to envelop from above the overall sliding device 10, and constituted with the ceiling part 37 closing from above the overall sliding device 10 and having therein the opening 13 lying in opposition to the top surface 64 of the table 1, and the peripheral part 45 having the lengthwise opposite end sides 38 and the widthwise opposite lengthwise sides 39 all of which extend downwards from the ceiling part 37 to surround around the sliding device 10. The end sides 38 of the covering 3 have the locking parts 32 to fit over the end blocks 4 and 5 on the forward and aft ends 63 of the bed 2 to keep in place the covering 3 with respect to the end blocks 4 and 5. With the covering 3 constructed as stated earlier, the inside 54 of the locking part 32 as shown in FIG.

Figure 13:
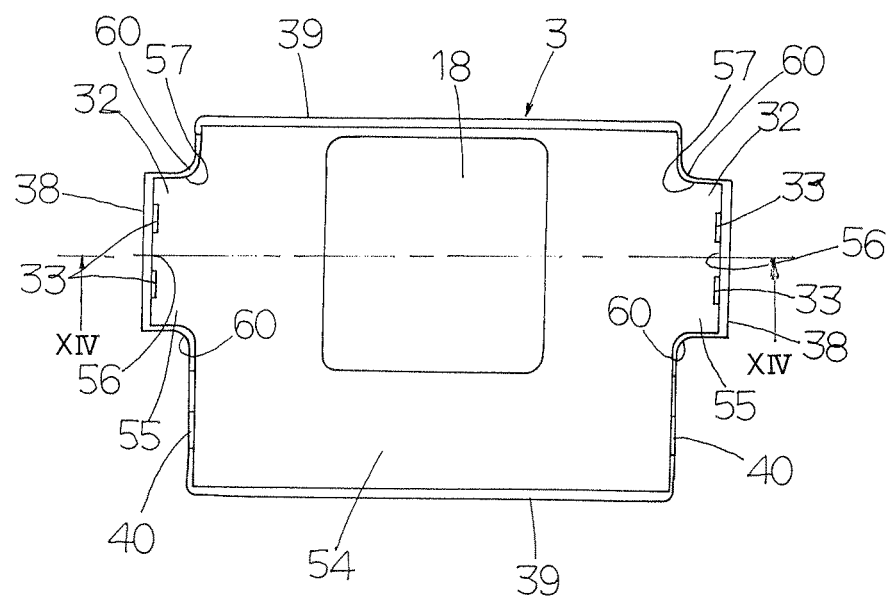
FIG. 13 is a view in bottom plan showing the covering of FIG. 10.
Figure 14:
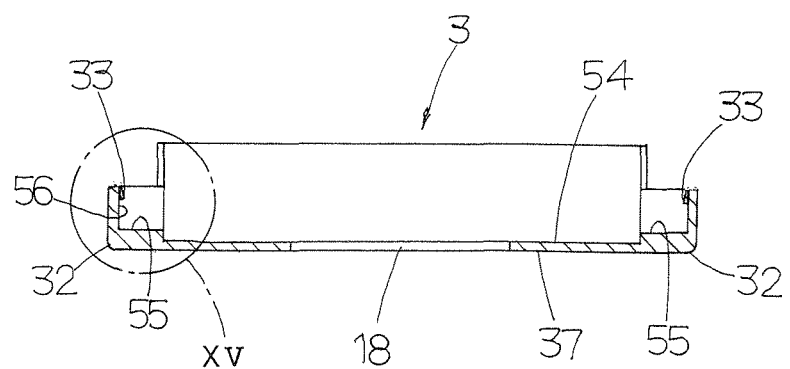
FIG. 14 is a view in longitudinal section of the covering of FIG. 13, the view being taken on the plane of line X IV-X IV of FIG. 13.
Figure 15:
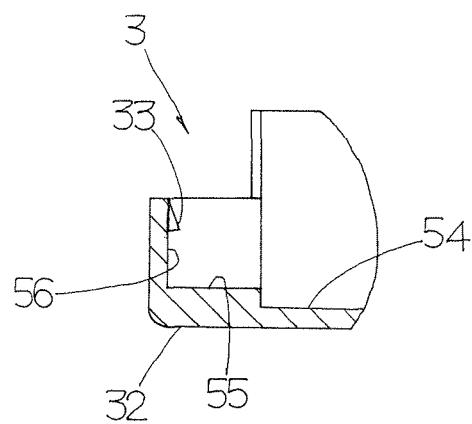
FIG. 15 is a fragmentary enlarged view of an encircled area X V in the covering of FIG. 14.

13 is defined with an interior bottom 55, a pair of interior side surfaces 57 and an interior end surface 56 each of which is expected to come into contact or abutment with the top 50, the widthwise opposite side surfaces 48 and the rear surface 46 of one of the end blocks 4 and 5 to set in place the covering 3 relative to the sliding device 10. The interior bottom 55 of the covering 3 when having come into abutment with the top 50 of the end block 4 or 5 determines the position of the covering 3 in height or vertical direction relative to the sliding device 10. The interior side surfaces 57 when having come into contact with the widthwise opposite side surfaces 48 of the end block 4 or 5 determines the sidewise position of the covering 3. Moreover, the interior end surface 56 of the covering when having come into contact with the rear surface 46 of the end block 4 or 5 determines the lengthwise position of the covering 3. On the interior end surface 56 inside the locking part 32 of the covering 3, there is provided a pair of locking jaws 33 extended above the interior end surface 56 as shown in FIGS. 13 to 15. The pair of locking jaws 32 makes fit-engagement with the locking recesses 32 on the rear surface 46 of the end block 4 or 5 to fasten the covering 3 to the end block 4 or 5 as shown in FIG. 3

With the covering 3 made of synthetic resin, the locking parts 32 with the locking jaws 33 are easier to suffer elastic deformation to make snapped fit-engagement between the covering 3 and the end blocks 4 and 5. As a result, the covering 3 may be mounted to the end blocks 4, 5 or the sliding device 10 with just one-touch operation. Although but the pair of locking jaws 33 is shown for security of steady mounting of the covering 3 in the illustrative embodiment, it will be appreciated that any number of the jaws and any fit-complementary relation between the end blocks 4, 5 and the covering 3 may be used. Moreover, the end sides 38 of the covering 3 at their widthwise opposite ends 60 are each partially cut away or gouged out to make it easier to get direct access to holes 34 which are made at four corners of the bed 2 and used to fasten the sliding device 10 to any machine bed and so on. Thus, the locking part 32 of the end side 38 extending between the gouged areas 60 bulges lengthwise outwards. In addition, one side of the gouged areas 60 is enlarged widthwise outwards and lengthwise of the sliding device 10 to cover the linear encoder 19 lying under the eaves 26 of the table 1 and further provided at lengthwise opposite ends thereof with slots 40 through which the sensing line 16 extends to the sensor element 23 of the encoder 19. The end sides 38 have recesses 58 to fit over or conform to the bed 2. A top 44 of the ceiling part 37 lying above the eaves 26 of the table 1 is somewhat lower in level than a top 43 of the ceiling part 37 extending across the end blocks 4 and 5 to prevent the members such as works and so on mounted on the auxiliary table 11 from any collision or contact with the top 44 of the ceiling part 37.

What is claimed is:

1. A sliding device with a top surface and a bottom surface of an overall flat configuration, comprising:
   a plate-like bed of quadrilateral shape,
   a quadrilateral plate-like table movable for reciprocation relative to the bed through a pair of linear motion guide units mounted on lengthwise side edges of the bed, and
   a moving-magnet linear motor built in between the table and the bed to extend lengthwise between the linear motion guide units and composed of a field magnet array and an armature assembly lying in opposition to the field magnet array;
   wherein the bed has a lengthwise recess extending in a moving direction of the table, an armature assembly comprising a coil board, the armature assembly fitting into the recess such that the coil board is disposed in contact with a bottom surface of the recess, and end blocks fit into the recess at the lengthwise opposite ends of the bed in adjacency to lengthwise opposite ends of the armature assembly,
   wherein a covering is mounted to the end blocks installed on lengthwise opposite ends of the bed, the covering being composed of a ceiling part having an opening in opposition to an upper surface of the table and enveloping from above the sliding device around the opening, and a peripheral part extending downwards from the ceiling part to surround around the lengthwise side edges and the lengthwise opposite ends of the bed;
   wherein an auxiliary table smaller in size than the table is fastened to the upper surface of the table through the opening in the covering, a member such as a work being mounted on the auxiliary table to be controlled in position,
   wherein the auxiliary table has a rectangular shape and is secured to a lengthwise middle of the table, a length of the auxiliary table in a moving direction being less than a length of the table subtracted by twice a stroke distance of the table, and wherein the opening in the covering is formed in a rectangular contour of a dimension which conceals lengthwise opposite ends of the table from view after the table has moved within a movable range, and
   wherein the end blocks each are a solid body defined with a top surface, widthwise opposite side surfaces and an outward rear surface to keep the covering in place, and the outward rear surface having thereon a locking recess, and the covering on interior end surfaces thereof has locking jaws extended above the interior end surfaces in opposition to the locking recesses of the end blocks, so that the locking jaws snap-fittingly engage with the locking recesses on the end blocks after the peripheral part around the locking jaws have suffered partially an elastic deformation.

2. A sliding device constructed as recited in claim 1, and wherein the end blocks are tightened together with the coil board to the bed with using screws extended through holes formed on side ends of the end blocks, the end blocks being raised above the bed up to a height short of the upper surface of the table to keep the table against getting out of the bed, and further the end blocks have butting surfaces to come into collision with the lengthwise opposite ends of the table, the butting surfaces of the end blocks having elastically deformable cushioning portions in which many vertical ridges of a triangle in cross section are juxtaposed closely each other in a widthwise direction.

3. A sliding device constructed as recited in claim 1, wherein end sides of the covering at widthwise opposite ends thereof are each partially cut away or gouged out to make it easier to get direct access to holes which are made at four corners of the bed and used to fasten the sliding device to a machine bed.

4. A sliding device constructed as recited in claim 1, wherein one of the end blocks has a recess open to fit snugly over a connector molded and wired with a power cable of the armature assembly, the end block having a flat bottom to come into close engagement with the coil board, and another end block has on a bottom surface thereof a stepwise recess to fit over one end of the coil board.

* * * * *